United States Patent [19]
Yumine

[11] Patent Number: 5,581,365
[45] Date of Patent: Dec. 3, 1996

[54] REMOTE CONTROL SYSTEM FOR CONTROLLING TAPE PLAYBACK APPARATUS ON THE BASIS OF TIME CODE DATA RECORDED ON THE RECORDING TAPE WITH THE INFORMATION DATA TO BE REPRODUCED

[75] Inventor: Toru Yumine, Kanagawa, Japan

[73] Assignee: Sony Corporation, Tokyo, Japan

[21] Appl. No.: 427,998

[22] Filed: Apr. 25, 1995

Related U.S. Application Data

[63] Continuation of Ser. No. 127,592, Sep. 28, 1993, abandoned.

[30] Foreign Application Priority Data

Oct. 1, 1992 [JP] Japan ..................... 4-289544

[51] Int. Cl.⁶ ................................. H04N 5/782
[52] U.S. Cl. .................. 386/65; 360/71; 360/72.2; 360/72.3; 360/73.01; 386/68; 386/80; 386/81; 348/734
[58] Field of Search ................. 358/335, 310, 358/311, 312; 348/734; 360/10.1, 10.2, 10.3, 13, 14.1, 14.2, 14.3, 33.1, 71, 72.1, 72.2, 72.3, 73.01; H04N 5/76, 5/78, 5/782

[56] References Cited

U.S. PATENT DOCUMENTS

| | | | |
|---|---|---|---|
| 4,394,694 | 7/1983 | Ninomiya et al. | 360/14.3 |
| 4,635,144 | 1/1987 | Goto et al. | 360/72.2 |
| 5,138,599 | 8/1992 | Fukushima et al. | 369/32 |
| 5,140,570 | 8/1992 | Nagasawa et al. | 369/32 |
| 5,175,716 | 12/1992 | Min | 369/32 |
| 5,195,068 | 3/1993 | Morishima | 369/32 |
| 5,202,866 | 4/1993 | Otsubo | 369/32 |
| 5,265,077 | 11/1993 | Yoshimoto et al. | 369/32 |

*Primary Examiner*—Thai Q. Tran
*Assistant Examiner*—Khoi Troung
*Attorney, Agent, or Firm*—William S. Frommer; Alvin Sinderbrand

[57] ABSTRACT

In a remote control system for controlling operation of a tape playback apparatus for reproducing an information signal from a recording tape on which a time code is recorded with said information signal; the operation of the playback apparatus is controlled on the basis of data representative of a cue-up command and cue-up point, the presence or absence of the time code contained in the information signal to be reproduced from the recording tape by the playback apparatus, and the presence or absence of a change in value of the time code. When the time code has not been detected or the change in value of the time code has not been detected after the cue-up command has been fed to the tape playback apparatus, the recording tape is driven at a relatively high speed by a predetermined amount, and then the cue-up command is again fed to the tape playback apparatus.

3 Claims, 4 Drawing Sheets

REMOTE CONTROL SYSTEM FOR CONTROLLING TAPE PLAYBACK APPARATUS ON THE BASIS OF TIME CODE DATA RECORDED ON THE RECORDING TAPE WITH THE INFORMATION DATA TO BE REPRODUCED

This application is a continuation of application Ser. No. 08/127,592, filed Sep. 28, 1993 now abandoned.

BACKGROUND OF THE INVENTION

1. Field of the Invention

The present invention relates to a remote control system for controlling an operation of a playback apparatus such as a video tape recorder (hereinafter referred to as a VTR) and more particularly a remote control system for controlling a tape playback apparatus on the basis of time code data recorded on the tape when the video or other information signal is recorded thereon.

2. Description of the Prior Art

For instance, U.S. Pat. No. 4,394,694 discloses a control device for controlling an operation of a VTR. In the case where a cue-up operation is effected in a playback apparatus such as a VTR by using a remote control device for remotely controlling the operation of the playback apparatus, the remote control device only monitors the status of the playback apparatus in a cue-up control sequence after a cue-up command is outputted from the remote control device to the playback apparatus.

Since the conventional remote control device only monitors the status of the playback apparatus, when the status is indicated to be the cue-up operation in spite of the fact that the cue-up operation is not being effected by the playback apparatus, for example, due to the fact that no time code is recorded on the recording tape and a playback head is located at an end of a recording region of the recording tape, it is necessary to wait a long time until it is detected that the cue-up operation has not been effected. The conventional system suffers from such a defect.

OBJECTS AND SUMMARY OF THE INVENTION

A primary object of the present invention is to provide a remote control system by which a cue-up operation is quickly completed with high precision.

In order to attain the above and other objects according to the present invention, a remote control system for controlling an operation of a playback apparatus for reproducing an information signal from a tape recording medium, comprises an input means to which data representative of a cue-up command and a cue-up point are supplied; a first detecting means for detecting the presence or absence of a time code contained in the information signal reproduced from the tape recording medium by the playback apparatus; a second detecting means for detecting the presence or absence of a change in value of the time code reproduced from the recording medium by the playback apparatus; and control means for controlling operation of the playback apparatus on the basis of the data supplied to the input means and detection results of the first and second detecting means, and wherein the control means feeds a command for moving the tape recording medium at a relatively high speed by a predetermined amount when the time code is not detected by the first detecting means or when change in value of the time code is not detected by the second detecting means after the cue-up command has been fed to the playback apparatus, and thereafter, the control means again feeds the cue-up signal to the playback apparatus.

DETAILED DESCRIPTION OF A PREFERRED EMBODIMENT

An embodiment of the invention will now be described with reference to the accompanying drawings.

Figure 1:
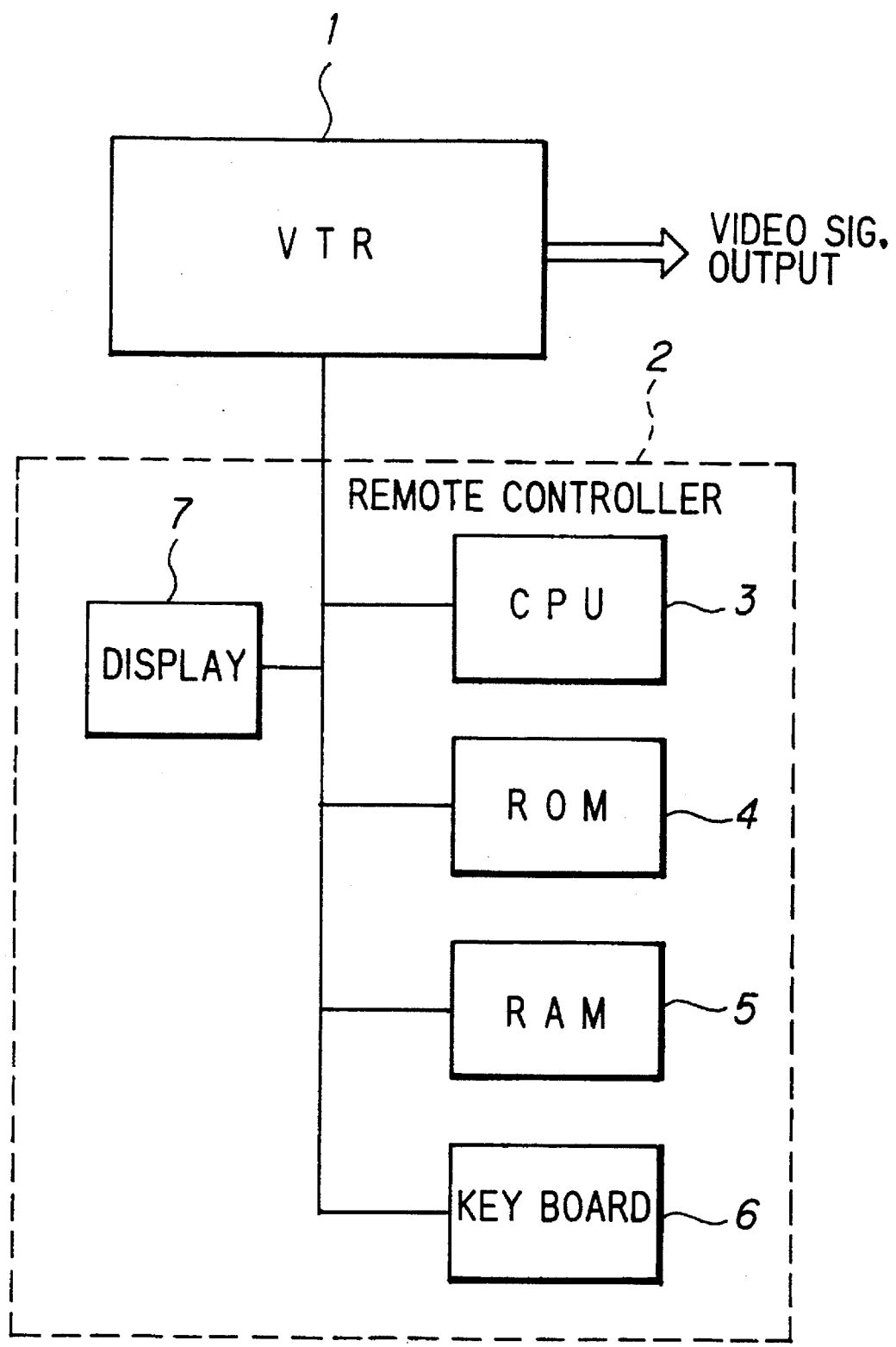
FIG. 1 is a block diagram showing remote control system according to an embodiment of the invention.

The system of FIG. 1 is shown to be generally composed of a playback apparatus such as a VTR 1 and a remote controller 2 for the playback apparatus.

The remote controller 2 includes a central processing unit 3 (hereinafter referred to as CPU), a ROM 4 from which a program is read out by the CPU 3, a RAM 5 in which data for controlling the VTR 1 are written and from which data for controlling the VTR 1 are read by the CPU 3, an input means 6 such as a key board and a display 7 for displaying respective information.

The operation of CPU 3 within the remote controller 2 in the cue-up mode will be explained with reference to a flowchart shown in FIGS. 2 to 4.

Figure 2:
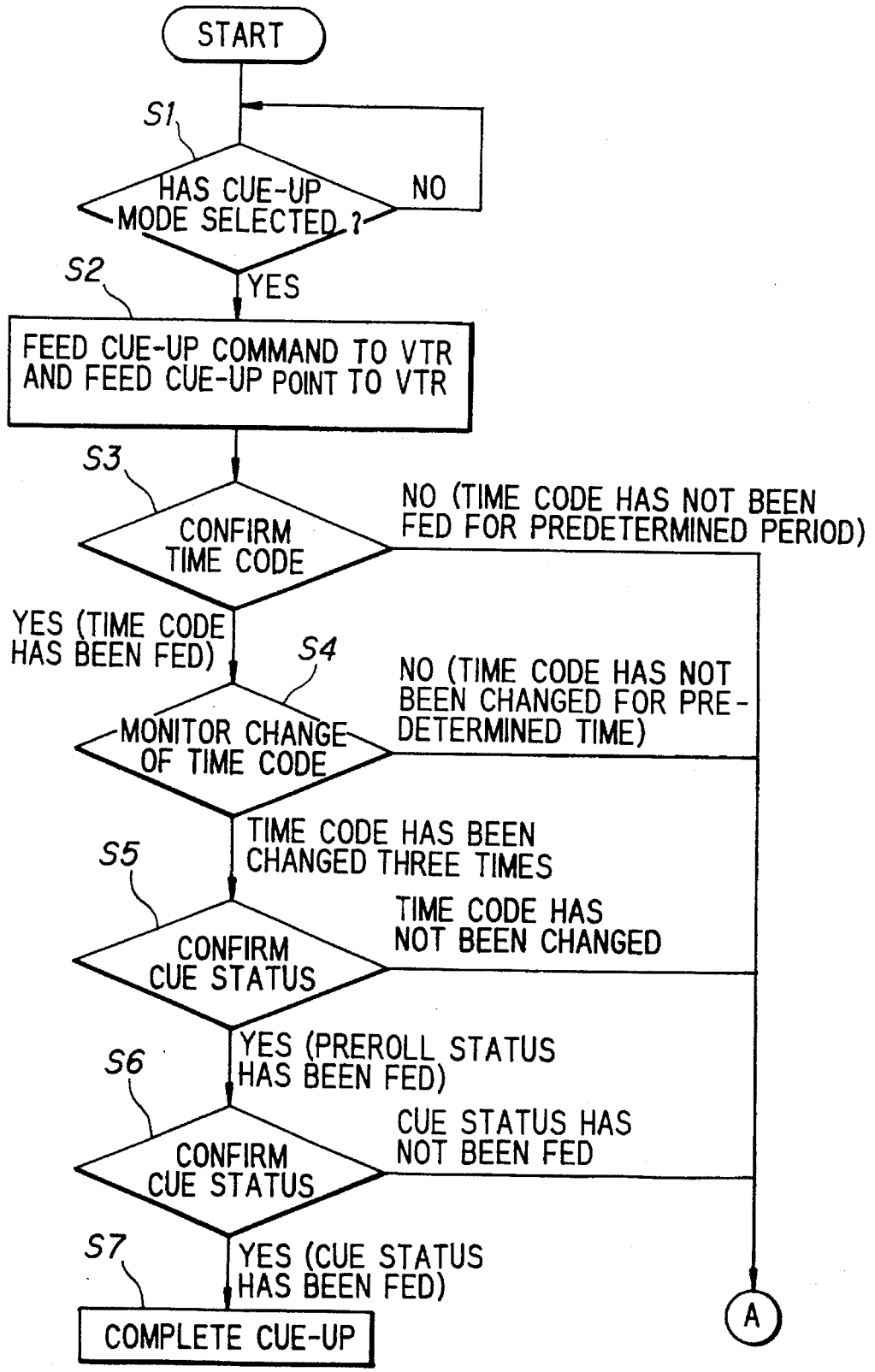
FIG. 2 is a flowchart showing a processing sequence of a first stage in a cue-up operation by a CPU of the remote control system shown in FIG. 1.
Figure 3:
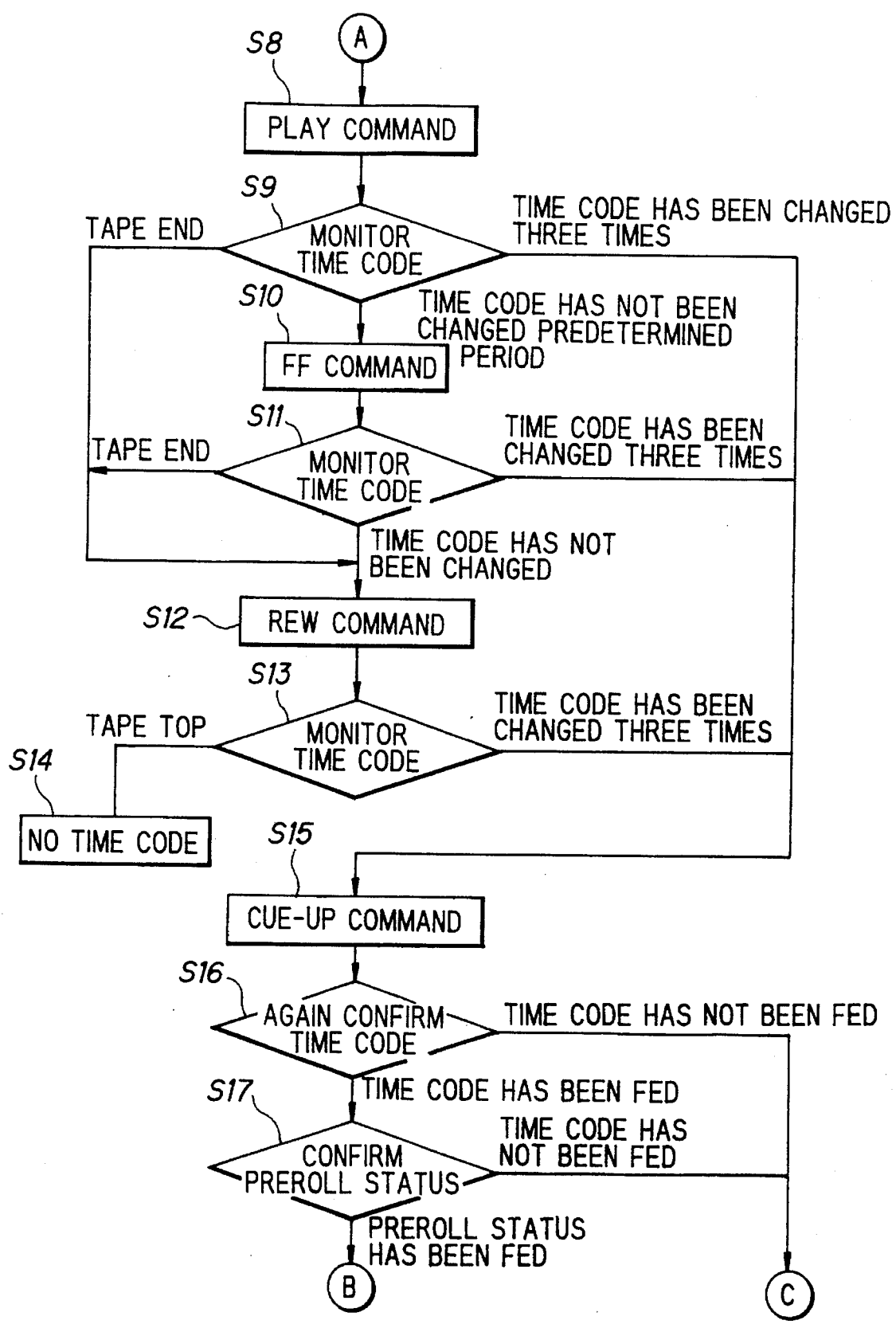
FIG. 3 is a flowchart showing a processing sequence of a second stage in a cue-up operation by a CPU of the remote control system shown in FIG. 1.

FIG. 2 shows a processing sequence of a first stage of CPU 3 in the cue-up mode, FIG. 2 shows a processing sequence of a second stage and FIG. 3 shows a processing sequence of a third stage.

The processing sequence of the first stage will first be described. In the step S1 shown in FIG. 2, when a cue-up command and a cue-up point are inputted by the actuation of the key board 6 and it has been judged that the cue-up mode has been selected, the operation is advanced to the step S2 where the inputted cue-up command and cue-up point are sent from CPU 3 to VTR 1.

In VTR 1, in response to this operation, a recorded signal on a tape (not shown) loaded therein is reproduced for reading a time code from the tape.

Subsequently, in step S3, it is confirmed whether or not the time code that should have been recorded together with a video signal on the tape is being fed from the VTR 1 which reproduces the signal on the tape. If the time code is fed therefrom, the operation is advanced to step S4.

In step S4, change of the fed time code is monitored, and when it is confirmed that the time code has been changed three-times continuously for a predetermined period of time, the operation enters into the cue-up mode and step S5.

In step S5, the tape is cued up to the cue-up pint, and it is judged whether or not a preroll status (which shows an operation for returning the tape by a predetermined amount from the playback starting point forwardly) is fed from VTR 1. When it is confirmed that the preroll status has been fed, the operation enters into a next step S6.

In step S6, it is judged whether or not a cue status (which shows that the tape has been fed to the cue-up point and the tape is stopped at this point) is fed from VTR 1. When the cue status is fed, the cue-up operation is deemed to be completed in step S7. A character display showing the completion of the cue-up operation is displayed on the display 7. Then, the cue-up operation is completed.

IN the case where the time code has not been fed for the predetermined period of time in the step S3, or in the case where the time code has not been changed in the step S4, or in the case where the time code has not been changed during the cue-up operation in step S5 or in the case where the cue status has not been fed in the step S6, the operation enters into step S8 in the processing sequence of the second stage shown in FIG. 3.

In step S8, a command for keeping VTR 1 in a play condition is automatically fed to VTR 1, and the operation enters into step S9.

In step S9, the time code fed from VTR 1 is monitored. In the case where the time code has not been changed for a predetermined period of time, the operation enters into step S10.

In step S10, a command for keeping VTR 1 in a FF (fast forward) condition for a predetermined period of time is automatically fed to VTR 1. Then, the operation enters into step S11.

In step S11, the time code fed from the VTR 1 is monitored. In the case where the time code has not been changed for a predetermined period of time, the operation enters into step S12.

In step S12, a command for keeping VTR 1 in a REW (rewind) condition for a predetermined period of time is automatically sent to VTR 1. The operation enters into step S13.

In step S13, the time code fed from VTR 1 is monitored. In the case where it is judged that the tape has not been delivered and the tape remains at the tape top, the operation enters into step S14 in which the display displays that no time code is present. Then, the operation is finished.

Also, in each of steps S9, S11 and S13, when it is confirmed that the time code has been changed three times for the predetermined period of time, respectively, the operation enters into step S15.

In step S15, the cue-up command is automatically fed to VTR 1, and the operation enters into step S16.

In step S16, it is confirmed whether or not the time code is fed from VTR 1 during the cue-up operation. In the case where the time code is fed thereinto, the operation enters into step S17.

In step S17, it is judged whether or not the tape has been cued up to the above-described cue-up point and further whether the preroll status is fed from VTR 1. When it is confirmed that the preroll status has been fed, from the VTR 1, the operation enters into a step S18 in the processing sequence of the third stage shown in FIG. 4.

In step S18, it is judged where or not the cue-status has been fed from VTR 1. When the cue status has been fed, in step S19, the cue-up operation is deemed to be finished, and the program causes the display 7 to show the completion of the cue-up operation. Then, the cue-up operation is finished.

Figure 4:
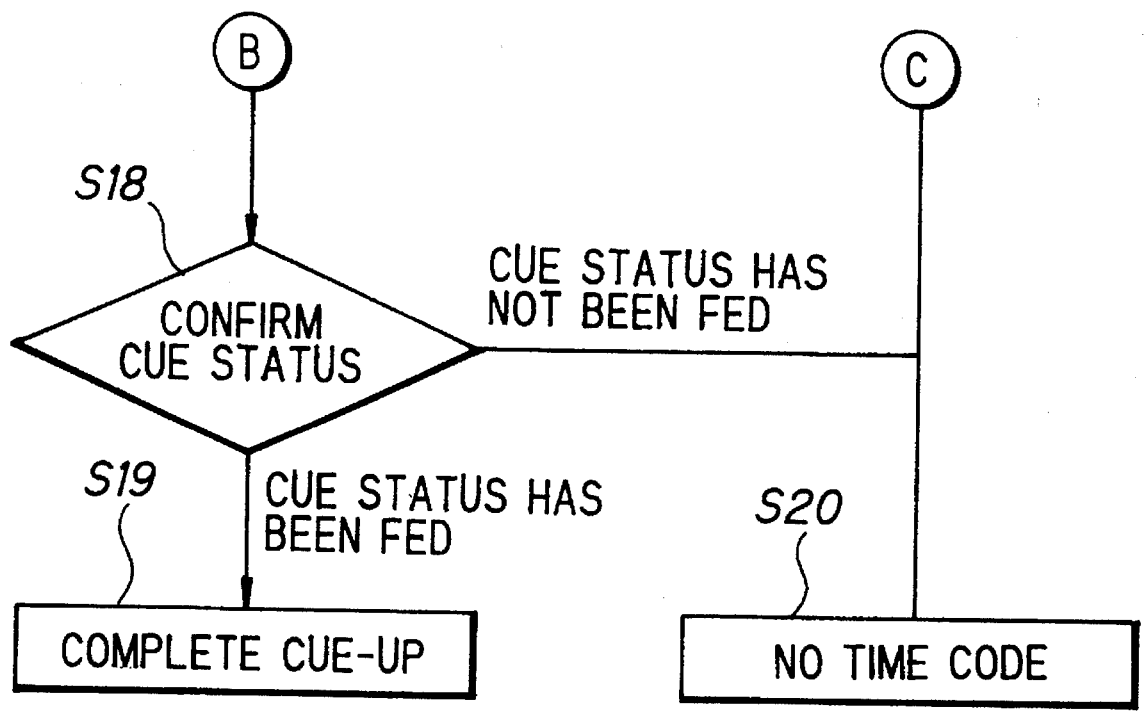
FIG. 4 is a flowchart showing a processing sequence of a third stage in a cue-up operation by a CPU of the remote control system shown in FIG. 1.

On the other hand, in the case where the time code has not been fed in step S16 in the flowchart shown in FIG. 3, or in the case where the time code has not been changed during the cue-up operation and the preroll status has not been fed in step S18 of the flowchart shown in FIG. 4, the operation enters into step S20. In step S20, the program causes the display 7 to show that no time code has been fed. Then, the programming operation has been completed.

As described above, in the remote control system according to the foregoing embodiment of the invention, when the cue-up command and the cue-up point are fed from the remote controller 2, the display 7 displays whether or not the cue-up operation is normally completed or whether an abnormal condition of the cue-up operation has occurred, not only according to the change in status of the VTR 1 but also on the basis on monitoring the cue-up operation status after the change of time code and the presence or absence of the recorded signal fed from the VTR 1 that reproduces the signals on the tape, and in the case where the normal cue-up operation could not be effected, the tape is delivered (in playback, fast forward and rewind modes) to feed the cue-up command and the cue-up point to the VTR 1.

With such an arrangement, if the time code has not been recorded on the tape or the VTR 1 is deemed to be in an operational or on state in spite of the fact that the VTR 1 has not effected the cue-up operation with the tape located at the tape top or the tape end, it is possible to avoid wasteful consumption of time when such conditions are maintained for a long time.

In accordance with the invention, notice of the normal completion and abnormal completion of the cue-up operation is quickly supplied to the user of the remote controller, and hence reliability of the notice is enhanced. In case of a broadcasting system, it is possible to avoid in advance an accident such as an on-air mistake.

Incidentally, in the embodiment shown, a VTR is used as a playback apparatus. However, it is apparent that the present invention may be applied to a playback apparatus for reproducing an audio signal recorded on a tape.

As described above, according to the present invention, after the cue-up command has been fed to the tape playback apparatus, the time code included in an information signal recorded on the recording tape to be reproduced by the playback apparatus is monitored, and in the case where the time code has not been reproduced by the tape playback apparatus and a value of the reproduced time code has not been changed, a command for shifting the position on the tape at which the recorded signal is to be reproduced by a predetermined distance is fed and after the reproduced position has been moved by the predetermined distance, the cue-up command is again fed to the tape playback apparatus. Accordingly, it is possible to judge the actual movement of the tape and the reason for a recording blank of the time code. It is therefore possible to make a proper judgement relative to the completion of the cue-up operation. It is further possible to ensure a quick notice of the normal and abnormal cue-up operation to the remote controller and to enhance reliability of the operation.

What is claimed is:

1. A remote control device for controlling operation of a tape playback apparatus in reproducing an information signal from a scanned portion of a recording tape on which time code may be recorded with said information signal comprising:

input means for receiving data representative of a cue-up command and a cue-up point;

first detecting means for detecting the presence or absence of a time code in an information signal reproduced from said scanned portion of the recording tape by said tape playback apparatus;

second detecting means for detecting the presence or absence of changes in the value of any time code in an information signal reproduced from said scanned portion of the recording tape by said tape playback apparatus; and control means for initiating and controlling a cue-up operation of said tape playback apparatus on the basis of said data received by said input means and results of said detecting by said first and second detecting means, said control means supplying to said tape playback apparatus a command for moving said recording tape at a relatively high speed by a predetermined amount in response to the detection by said first detecting means of said absence of the time code or in response to the detection by said second detecting means of said absence of changes in the value of any time code being reproduced upon initiation of said cue-up operation in response to the cue-up command received by said input means, and upon completion of the relatively high speed movement of said recording tape by said predetermined amount, said control means again initiates the cue-up operation of said tape playback apparatus in response to said cue-up command.

2. The remote control device according to claim 1, wherein said command for moving said recording tape at the relative high speed is one of a fast forward command and a rewind command.

3. A control method for controlling operation of a tape playback apparatus in reproducing an information signal from a scanned portion of a recording tape on which tape code may be recorded with said information signal, said method comprising the steps of:

inputting data representative of a cue-up command and a cue-up point;

detecting the presence or absence of a time code reproduced with an information signal from said scanned portion of the recording tape by said tape playback apparatus;

detecting the presence or absence of changes in the value of any time code in the information signal which is being reproduced from said scanned portion of the recording tape by said tape playback apparatus;

initiating and controlling a cue-up operation of said tape playback apparatus on the basis of said data representative or a cue-up command and a cue-up point and on the basis of said detecting of the presence or absence of the time code and said detecting of the presence or absence of the changes in the value of the time code; and in response to detecting an absence of any time code being reproduced from the scanned portion of the recording tape or in response to detecting an absence of changes in the value of any time code being reproduced from the scanned portion of the recording tape upon the initiation of a cue-up operation in response to the cue-up command fed to said playback apparatus, shifting said recording tape at a relatively high speed by a predetermined amount, and, upon completion of the relatively high speed shifting of the tape by said predetermined amount, again feeding the cue-up command to said tape playback apparatus for again initiating a cue-up operation.

* * * * *